United States Patent [19]

Devolk et al.

[11] Patent Number: 5,852,242

[45] Date of Patent: Dec. 22, 1998

[54] APPARATUS WITH MECHANICAL AND ELECTRIC SPRINGS AND METHOD FOR ITS MANUFACTURE

[75] Inventors: Burton A. Devolk, Cedar Park; Matthew W. Ip; Bing F. Fung, both of Austin; Franklin W. Mayo, Houston, all of Tex.; Raymond K. Erickson, Troy, Mich.

[73] Assignee: I/O Sensors, Inc., Stafford, Tex.

[21] Appl. No.: 566,998

[22] Filed: Dec. 4, 1995

[51] Int. Cl.⁶ .................................................. G01P 15/13
[52] U.S. Cl. ..................................... 73/514.17; 73/514.24
[58] Field of Search ........................... 73/514.18, 514.24, 73/514.21, 514.17

[56] References Cited

U.S. PATENT DOCUMENTS

| | | |
|---|---|---|
| 3,427,540 | 2/1969 | Exworthy . |
| 3,877,313 | 4/1975 | Ferriss . |
| 4,353,254 | 10/1982 | Schroeder et al. . |
| 4,372,162 | 2/1983 | Shutt ..................................... 73/514.24 |
| 4,398,417 | 8/1983 | Shutt ..................................... 73/514.24 |
| 4,566,328 | 1/1986 | Bernard et al. . |
| 4,805,456 | 2/1989 | Howe et al. . |
| 4,841,772 | 6/1989 | Paik ..................................... 73/514.17 |
| 5,134,881 | 8/1992 | Henrion ............................... 73/514.35 |
| 5,211,051 | 5/1993 | Kaiser et al. . |

OTHER PUBLICATIONS

Widge Henrion, Len Disanza, Matthew Ip, Stephen Terry and Hal Jerman—Wide Dynamic Range Direct Digital Accelerometer, IEEE Publication C #278 –9/90/0000–0153 (1990).

R.P. Van Kampen, M.J. Vellekoop, P.M. Sarro and R.F. Wolffenbuttel—Application of Electrostatic Feedback To Critical Damping of An Integrated Silicon Capacitive Accelerometer, Sensors and Acuators A, 43 (1994).

Mark Van Paemel—Interface Circuit For Capacitive Accelerometer, Sensors and Actuators, 17 (1989) pp. 629–637.

F. Rudolf, A. Jornod, J. Bergqvist and H. Leuthold—Precision Accelerometers With ug Resolution, Sensors and Actuators, A21–A23 (1990) pp. 297–302.

Ted Smith, Olivier Nys, Michel Chevroulet, Marc Degrauwe—Electromechanical Sigma–Delta Converter for Acceleration Measurements, ISSCC94/Session 9/Sensors and Display Electronics/Paper TA94 (Feb. 1994) pp. 160–161.

(List continued on next page.)

Primary Examiner—Christine K. Oda
Attorney, Agent, or Firm—Bush, Riddle & Jackson L.L.P.

[57] ABSTRACT

Apparatus for measuring a characteristic of motion and methods for its manufacture are disclosed in which a sensor structure includes a support structure, and a mass suspended from such support structure by a spring connecting arrangement and electrical devices for measuring displacement of the mass which results from a force applied to the support structure. An apparatus is provided where the mechanical spring constant of the connecting arrangement of the sensor structure is provided to be a high value representative of a strong, stiff spring which resists breaking due to high forces applied to it, and where an electric spring constant is provided to yield a small effective sensor spring constant $K_{eff}=K_m-K_e$. Methods are also provided to manufacturing the apparatus by specifying the mechanical spring constant and providing an electric spring constant which will yield a desired effective spring constant which produces a desired characteristic of the sensor structure. Alternatively, the apparatus may be manufactured by specifying the electric spring constant which, with a mechanical spring constant, provides a certain sensor structure characteristic, e.g., natural frequency, and then providing a connecting arrangement characterized by a mechanical spring constant which yields such sensor characteristic. According to another aspect of the invention, the sensing force applied to the mass is adjusted in coordination with the mechanical spring constant and damping factor of the apparatus so that a desired characteristic of the apparatus is achieved.

8 Claims, 3 Drawing Sheets

OTHER PUBLICATIONS

Yoshinori Matsumoto and Masayoshi Esashi—Integrated Capacitive Accelerometer With Novel Electrostatic Force Balancing, Technical Digest of the 11th Sensor Symposium (1992) pp. 47–50.

Rob Legtenberg, Harrie A.C. Tilmans—Electrostatically Driven Vacuum—Encapsulated Polysilicon Resonators, Sensors and Actuators A 45 (1994) pp. 57–66.

Harrie A.C. Tilmans, Rob Legtenberg—Electrostatically Driven Vacuum–Encapsulated Polysilicon Resonators, Sensors and Actuators A 45 (1994) pp. 67–84.

H. Leuthold and F. Rudolf—An Asic For High Resolution Capacitive Micro–Accelerometers, Sensors and Actuators, A21–A23 (1990) pp. 278–281.

S. Suzuki and S. Tuchitani, et al.—Semiconductor Capacitance–Type Accelerometer With PWM Electrostatic Servo Technique, Sensors and Actuators, A21–A23 (1990) pp. 316–319.

Book—Electrostatics and Its Applications, A.D. Moore, Editor, John Wiley & Sons, 1973, pp. 53–55.

APPARATUS WITH MECHANICAL AND ELECTRIC SPRINGS AND METHOD FOR ITS MANUFACTURE

BACKGROUND OF THE INVENTION

1. Field of the Invention

This invention relates generally to a mechanical apparatus in which the displacement of a mass is sensed electromagnetically. This invention also relates generally to an accelerometer in which a sensor including a spring-mass-support structure is used to measure capacitively displacement of the mass in response to force applied to the sensor. In particular, the invention relates to a force rebalance micromachined silicon accelerometer in which the mass of its sensor is maintained at a predetermined position between cover plates by electromagnetic forces applied to the mass from a feedback loop as a function of the mass displacement measurement.

2. Description of the Prior Art

U.S. Pat. No. 4,922,756 which issued on May 8, 1990, and was assigned to the assignee of this application describes a micromachined accelerometer which includes a spring-mass-support sensor in which force and sense conducting areas are deposited on opposite faces of the suspended mass. Top and bottom cover plates have corresponding force and sense conducting areas or plates such that each of the conducting surfaces of the plates precisely faces a corresponding surface of the mass.

An electromagnetic feedback system is provided in the specification of the '756 patent which detects displacement of the mass of the spring-mass-support structure in response to force applied to the sensor. For frequencies of the applied force or acceleration below the resonant frequency of the sensor structure, displacement of the mass is proportional to acceleration. Displacement of the mass is measured by applying a voltage between the sense conducting areas of the opposite plates. Such voltage creates a sense electric field across the sense conducting areas of the suspended mass and induces a sense voltage on the conducting areas of the mass which is proportional to the displacement of the mass between the opposite plates.

A forward circuit of the '756 patent generates a displacement signal which is representative of the displacement that the mass has moved from a reference position between the plates. A feedback circuit responds to the displacement signal by creating an electromagnetic (e.g., electrostatic) restoring force to return the mass to its reference signal. An analog electromagnetic feedback signal is described in the '758 patent, but an alternative arrangement by the forward circuit converts the displacement signal to an output binary stream. A feedback circuit, in response to such output binary stream, generates a binary electromagnetic restoring force to the mass so as to return it to its reference position. The output binary stream is representative of a characteristic of position, preferably acceleration of the support structure. The '756 patent is incorporated by reference herein.

A published paper, "*Application of electromagnetic feedback to critical damping of an integrated silicon capacitive accelerometer*" by R. P. VanKampen et al, Sensors and Actuators A, 43 (1994) pp 100–106, describes a seismic mass suspended by a number of narrow beams. The dynamic behavior of the accelerometer is determined by the mass, M, the damping coefficient, f, and the spring constant, $K_z$ of the beam suspension:

$$\frac{Z(s)}{F(s)} = \frac{1}{s^2 + \frac{f}{M}s + \frac{K_z}{M}}$$

where F(s) represents the acceleration acting on the device and Z(s) represents the resulting mass displacement, in the Laplace domain. The formulation is valid only for small mass displacements, because for small displacements the damping of the beam suspension as well as the beam suspension can be approximated by linear equations. A feedback loop is provided to keep the mass displacement at a small level. Electromagnetic restoring force is provided. Different ways of adjusting the transfer function of the device are described. Descriptions are provided for adjusting the loop gain and inserting a low-pass filter into the feedback loop and increasing the bandwidth of such filter.

Other published prior art papers describe operative silicon microaccelerometers which are used in an electromagnetic force-balancing configuration. The prior art does not provide a capacitive silicon microaccelerometer, or a method for manufacturing it, having a desired mechanical spring constant while simultaneously having a desired electromechanical characteristic of the accelerometer when the accelerometer is used in a controlled electrostatic force feedback environment.

IDENTIFICATION OF OBJECTS OF THE INVENTION

A primary object of the invention is to provide an apparatus and a method for manufacturing such apparatus which has a mass, the displacement of which is measured electromagnetically, and in which electromagnetic sensing and restoring forces are coordinated with mechanical restoring forces of the apparatus so that it has a desired response characteristic. Another object of the invention is to provide a mass-spring-support device having electromagnetic sensing and balancing forces applied to it, and a method for manufacturing it, where mechanical spring characteristics are coordinated with the level of electromagnetic sensing force and balancing feedback force to produce desired operating characteristics of the device.

A more specific object of the invention is to provide an accelerometer and a method for its manufacture having a sensor in which springs which carry a seismic mass are characterized by a high mechanical spring constant, and the electromagnetic sensing and force balancing levels applied to the seismic mass are characterized by an electric spring constant such that the equivalent spring constant of the accelerometer is substantially zero.

A still more specific object of the invention is to provide an accelerometer and a method for its manufacture whereby an effective level of force sensing and rebalancing of a mass of a mass-spring-support sensor is provided which achieves an operating characteristic of the accelerometer and the springs of the sensor are fabricated so as to achieve a desired effective spring constant of the sensor to achieve said operating characteristics.

SUMMARY OF THE INVENTION

The objects described above along with other advantages and features are provided in an apparatus and a method for its manufacture for measuring a characteristic of motion, such as acceleration. A sensor structure is provided which includes a mass carried from a support structure by a connecting arrangement. Such connecting arrangement may be springs or beams connected between the support and the mass. The connecting arrangement provides a mechanical spring force which opposes movement of the mass. The apparatus includes an arrangement to generate a displacement signal as a function of time which is representative of the distance the mass has moved with respect to the support structure in response to force applied to the sensor. An electromagnetic restoring force, in response to the displacement signal is applied to the mass. Such restoring force is in a direction opposite that of the mechanical spring force.

According to one embodiment of the invention, the sensor structure has a connecting arrangement characterized by a high mechanical spring constant, but as a result of the electromagnetic sensing and restoring forces applied to the mass, an effective spring constant results which is selected to be a small positive value representing the difference between the mechanical spring constant and the electric spring constant. The high mechanical spring constant results in a connecting arrangement of springs or beams which is capable of withstanding large g-force shocks to the sensor. The small positive effective spring constant results in an accelerometer characterized by high sensitivity at D.C. ("D.C." as used herein, meaning "zero frequency") and low frequencies. In other words, to low frequency forces, the accelerometer appears to be one having a spring constant which is very low so that the accelerometer has high sensitivity to such forces. Simultaneously, the accelerometer has stiff mechanical springs which allows the sensor to withstand high g shocks without the springs breaking.

The invention includes a method for manufacturing an accelerometer having a mass-spring-support sensor, with a forward displacement signal circuit for measuring displacements of the mass, and a force balancing feedback arrangement for electromagnetically forcing the mass to a predetermined position. Such method includes the step of fabricating the sensor structure having a mechanical spring constant $K_m$ which is representative of a desired mechanical characteristic of the connecting arrangement and the step of providing electromagnetic sensing and feedback forces of a level represented by an electric spring constant $K_e$, so that the difference between the mechanical spring constant and the electric spring constant produces a desired characteristic of the apparatus. According to one aspect of the method, such difference is caused to be substantially zero such that the transfer function of the sensor structure includes a substantially pure integrator.

According to another aspect of the invention a sensor, a forward displacement signal circuit, and a force balancing feedback arrangement are provided to apply a feedback force to the mass represented by an electric spring constant $K_e$. Next, the mechanical spring constant of the connecting arrangement, such as springs between the mass and the support, is determined by first determining an effective spring constant $$K_{eff} = K_m - K_e,$$

where $K_m$ represents the mechanical spring constant of the connecting arrangement, such that a desired characteristic of the sensor structure as a function of $K_{eff}$ results, and then the springs are fabricated so that they are characterized by a mechanical spring constant of $K_m = K_{eff} + K_e$. One desired characteristic of such structure is its natural frequency, $$\omega_e = \sqrt{\frac{K_{eff}}{m}}.$$

BRIEF DESCRIPTION OF THE DRAWINGS

The objects, advantages and features of the invention will become more apparent by reference to the drawings which are appended hereto and wherein an illustrative embodiment of the invention is shown, of which.

DESCRIPTION OF THE INVENTION

Figure 1:
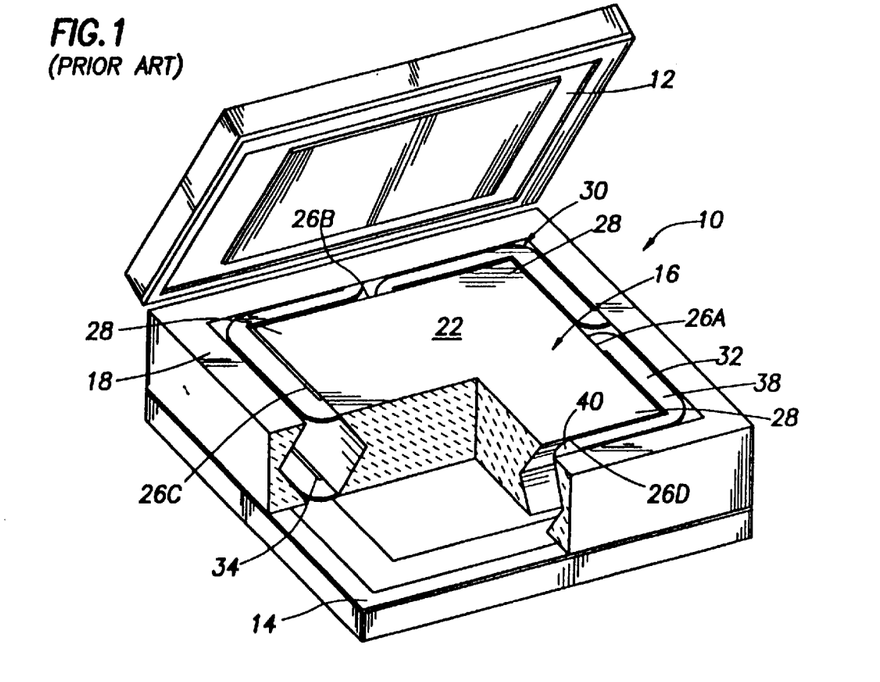
FIG. 1 illustrates a micromachined mass-spring-support sensor arrangement with top and bottom cover plates, where L-shaped springs are placed in the space between the mass and support frame and extend about corners of the mass.

FIG. 1 illustrates the sensor structure of the invention as shown generally at 10. Such sensor structure 10 is disclosed in copending U.S. application Ser. No. 01/218,525 filed Mar. 28, 1994 and assigned to the assignee of this application (now U.S. Pat. No. 5,652,384). Such application is incorporated by reference herein.

The sensor assembly 10 of FIG. 1 has a body including a top cover (or cap) 12, a bottom cover (or cap) 14, a central (or seismic) mass 16 between top cover 12 and bottom cover 14, and a generally rectangular frame 18 receiving such central mass 16 therein between covers 12 and 14. Sensor assembly 10 may be formed from wafers of a nonmetallic monocrystalline material such as silicon, germanium, quartz, gallium arsenide, gallium phosphate, etc. Central mass 16 may have a thickness of about 1000 microns or smaller. Central mass 16 has an upper surface 22 and a lower surface, each of which has sides which are substantially perpendicular to neighboring sides. In other words, the top and bottom surfaces are preferably rectangular or square in shape, but it should be recognized that the corners of such surfaces may be rounded a small amount or even a large amount such that the surfaces are generally circular in shape. The top and bottom surfaces 22, 24, are substantially parallel. The sides 26A, 26B, 26C and 26D of mass 16 between surfaces 22 and 24 are of a concave V-shape and intersect each other at actual corners 28 (FIG. 1) or virtual corners not illustrated. Sides 26A–26D have upper and lower edges at respective upper and lower surfaces 22, 24. Mass 16 is spaced at 30 about its entire peripheral surface from adjacent frame 18 to define an open or void area therebetween.

A spring support structure or connecting arrangement to support mass 16 from outer frame 18 is provided in the space between mass 16 and frame 18 and includes four upper L-shaped spring members 32 and four superjacent lower L-shaped spring members 34. The terms L-shaped and elbow-shaped are used in the specification to identify the shape of spring members 32 and 34 where the springs have connected perpendicular legs of unequal length. Although the legs are of unequal length, such legs may be of almost the same length where connection to the mass and frame are both near a center line of the mass and the support frame. Spring members 32 and 34 fit about corners 28 of mass 16 with upper spring members 32 connected to the upper edge of mass 16 adjacent upper surface 22 and lower spring members 34 connected to the lower edge of mass 16 adjacent lower surface 24.

Each spring member 32, 34 of each superjacent spring pair is generally identical in shape. The composite mass 16—springs 32, 34 frame 18 is fabricated in two halves and joined together. Before joining, that is, when the bottom half of the composite is turned upside down, springs 34 are mirror images of the top springs 32.

Figure 2:
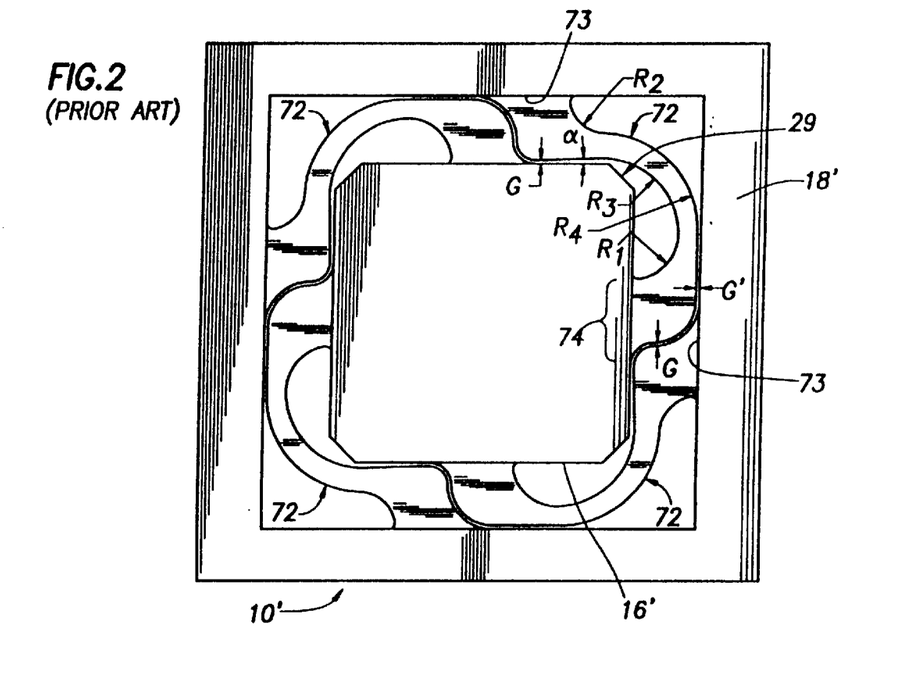
FIG. 2 is a plan view of the mass-spring-support structure of a sensor arrangement which shows the L-shaped springs modified in shape from corresponding L-shaped springs illustrated in FIG. 1.

Accordingly, only one spring member 32 is described in detail, because the remaining spring members 32, 34 are substantially identical. Spring member 32 is an L-shaped, thin, flexible ribbon-like spring which extends about and around a corner 28 or virtual corner of mass 16. The spring member 32 includes a relatively shorter leg 38 and an integral somewhat larger leg 40. Although an alternative embodiment is as shown in FIG. 2, the leg 38 could be designed to be longer than the leg 40. Upon the action of a force acting in a perpendicular direction to surfaces 22 and 24 of mass 16, top and bottom springs 32 and 34 are displaced or deflected upwardly or downwardly relative to the illustration of FIG. 3. Thus, springs 32, 34 are deformed linearly with input force applied perpendicular to the top and bottom surfaces of mass 16. Such linear movement of the springs enables an extremely accurate measurement of a variable related to such input force by measuring the displacement of mass 16 from its rest position. Such variable is preferably acceleration where forces are of D.C. and frequencies below the natural frequency of the sensor structure.

Mass 16 is restrained by eight springs including four upper springs 32 and four superiacent lower springs 34. Springs 32 and 34 tend to balance each other, and any acceleration moves mass 16 against springs 32, 34. Springs 32, 34 are preferably formed of silicon. The length of each leg and its thickness may be accurately controlled during the manufacture of the sensor structure in order to control the mechanical spring constant, $K_m$. The preferred mode for fabricating the sensor 10 or 10' of FIG. 1 or 2 is described in detail in copending U.S. application Ser. No. 08/218,363 filed Mar. 28, 1994, (now U.S. Pat. No. 5,484,073) and assigned to the assignee of this application such patent application is incorporated herein by reference specifically for its designation of adjusting the thickness of springs during manufacture so as to provide a desired mechanical spring constant, $K_m$, of a spring arrangement of a micromachined sensor.

Figure 3:
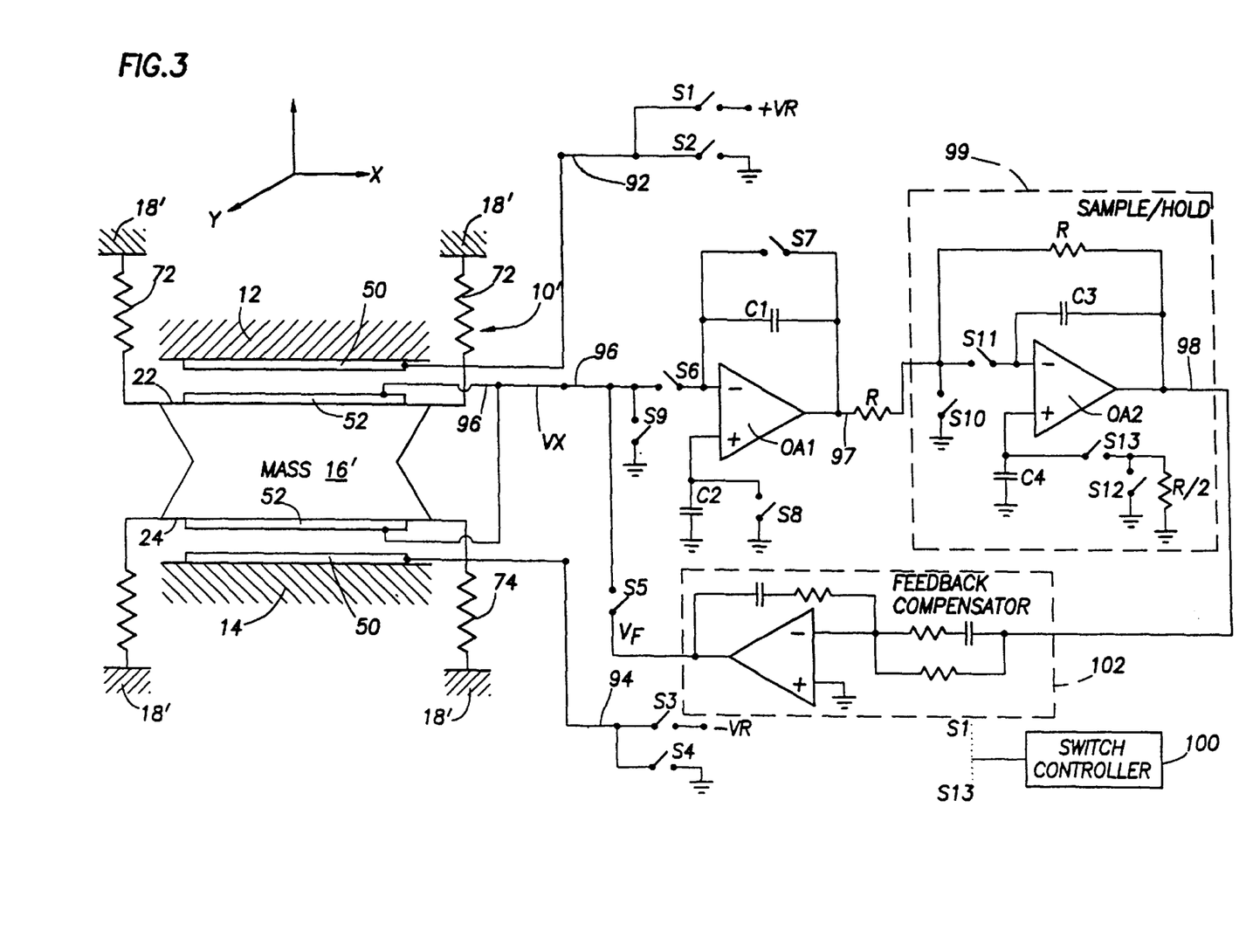
FIG. 3 is a schematic drawing of a sensor structure with a forward circuit for measuring displacement of the mass in response to a force applied to the support, and an electromagnetic feedback circuit for forcing the mass to return to a predetermined position.

The L-shape (or elbow-shape) of the springs, with each leg of the L being approximately the same length, contributes to the linearity and durability of the sensor. The preferred method for constructing the rectangular frame and mass structure is by semi-conductor fabrication techniques. The frame 18 and mass 16 are mirror images halves produced by ODE etch techniques. The two halves are bonded together to form the entire mass 16 and support frame structure 18. As illustrated in FIG. 3, conductive regions 50 and 52 are fabricated on the cover plates 12, 14 and on the top and bottom surfaces of mass 16. Such surfaces are shown exaggerated in thickness in FIG. 3 for ease of illustration. Electrical leads extend outwardly from such conductive regions or plates 50, 52 for connection to electrical circuits of FIG. 3.

FIG. 2 illustrates an alternative embodiment of the spring structure of FIG. 1. Such spring structure is described in detail in copending U.S. application 08/516,501 filed on Aug. 17, 1995 and assigned to the assignee of this application. Such copending application is hereby incorporated by reference. The differences in the spring structure of the sensor arrangement of FIG. 2, as compared to the spring structure of FIG. 1, extend the capability of the sensor to withstand higher lateral forces. Such lateral forces are called "g" forces to indicate the level of force as compared to the force of gravity at sea level. The structure of FIG. 2 not only increases the lateral shock survivability of the sensor over the structure of FIG. 1, but also decreases the level of stress on the springs by a few orders of magnitude even under normal operation where no lateral shock forces are applied.

At least three major differences may be observed between the alternative spring 72 arrangement of sensor structure 10' of FIG. 2 as compared to the sensor structure of 10 of FIG. 1.

First, the inside radius $R_1$ of the spring 72 where the spring 72 is connected to the proof mass 16' is greater for the spring arrangement of the sensor structure 10' of FIG. 2 as compared to the corresponding connection of spring 32 to mass 16 of FIG. 1. Likewise, the outside radius $R_2$ where the spring 72 is connected to the frame 18' is greater for the spring arrangement of the sensor structure 10' of FIG. 2 as compared to the corresponding connection of spring 32 to frame 18 of FIG. 1. Because the radii $R_1$ and $R_2$ of the structure of FIG. 2 are greater than corresponding radii of spring connections of FIG. 1, the annular space between frame 18' and mass 16' is greater than the corresponding annular space between frame 18 and mass 16 of FIG. 1. A great advantage of the spring structure of FIG. 2 over that of FIG. 1 is that stress concentrations at the connection locations of spring to mass and spring to frame are greatly reduced. In addition, the radii $R_3$ and $R_4$ of alternative spring structure of FIG. 2 are significantly enlarged (as compared to the structure of FIG. 1) to alleviate stress concentration around the elbow area which result from high lateral g forces.

Second, the width of the spring 72 varies as a function of its length from connection 74 at mass 16' to connection 73 at frame 18'. Such width is greater at the connection locations 74 and 73 than at the location where the spring 72 "bends" or curves about the mass corner 29. The effect of such varying width of spring 72 is to distribute stress more evenly along the length of the spring when the springs 72 are under lateral load.

Third, the space or gap G between two adjacent springs 72, at their respective connection locations 74 and 73 of the structure of FIG. 2 is reduced as compared to corresponding connection locations of springs 38 of FIG. 1. Likewise the gaps G' and G" between the spring 72 and the frame 18' side and the spring 72 and the mass 16' side are greatly reduced for the structure of FIG. 2 as compared to the corresponding gaps for the structure of FIG. 1. The narrow gaps G, G' and G" serve an important function in preventing excessive movements of the springs in response to high g lateral forces. Vertical, horizontal and diagonal forces in the lateral plane of the structure of FIG. 2 all cause springs 72 to move a small distance in response to such force. But the small gaps cause a corresponding frame edge or mass edge or adjacent spring to act as a stop to prevent the spring leg from moving a distance greater than the yield point of the spring material. In other words, the gap distances G, G' and G" are selected to be less than the maximum distance that the springs may move before they break. Under excessive lateral g loading, the spring mass structure should hit the stops at the same time. The mass will hit a spring, and one adjacent second spring will hit the frame, and a third spring will hit the second spring all at the same time.

Finally, as illustrated in FIG. 2, spring 72 defines an acute angle α as it nears mass 16' toward its connection 73 of frame 18'. Such angle α prevents spring 72 from contacting a corner of mass 16' when deflected by certain lateral forces. The acute angle α also ensures that when the structure is experiencing high lateral g forces and if the mass 16' should touch the spring 72, it will only touch the area of the spring that is rigidly attached to the frame 18' and not a higher stress area along the intermediate thinner section of the spring.

Design factors which influence the selection of gap distances, spring thickness (see FIG. 2 for example), etc. are:

(1) The maximum thickness of spring material which can be produced in the fabrication process;

(2) The narrowest gap distance which can be achieved by plasma etching of springs;

(3) The maximum g lateral loading which may be anticipated;

(4) The width of separation distances between mass and frame;

(5) An aspect ratio (width/thickness) which prevents buckling of the spring 72 before hitting stops; and (6) Tuning of the spring mass combination to a desired operating frequency and acceptable higher modes.

EXAMPLE

The design parameters of the design of silicon structures FIG. 2 are as follows:

| | |
|---|---|
| spring thickness | 31.8 μm |
| mass deflection under 1 g gravity field | .367 μm |
| highest stress under 1 g normal operating conditions (2.5 times improvement over FIG. 1 for an identical stiffness) | .0777 dynes/μm² |
| maximum stress under 10,000 g lateral force and 10 g vertical force (5.5 times improvement over FIG. 1 for an identical stiftness) | 26.7 dynes/μm² |
| maximum lateral movement of mass under conditions of 10,000 g lateral force and 10 g vertical force | 11.6 μm |
| maximum gap distance (mass can move 26.0 μm before spring breaks because of yield stress of silicon of 60 dynes/μm²) | 26.0 μm |
| shock resistance value as compared to design of FIG. 1 | 2 |

Description of Accelerometer of FIG. 3

The accelerometer system of FIG. 3 is placed in several states by a micro computer based switch controller 100 opening and closing various switches $S_1$–$S_3$. The switch controller operates at a clock frequency of 128KZ. A repetitive cycle which includes 32 states is produced by controller 100. Each cycle starts with the end of the forcing period and begins with the sensing periods. A description of the state of the arrangement of FIG. 3 under control of switch controller 100 follows.

STATE 0: SENSING PHASE: VOLTAGE EQUALIZATION

During State 0 Switch S5 is opened thereby disconnecting the forcing voltage $V_F$ from center pin or lead 96 from the conductive regions 52 of mass 16'. Very shortly thereafter, switch S9 is closed which rapidly discharges charge on the conductive regions 52 and brings them to ground or zero volts. The reference voltages $+V_R$ and $-V_R$ are applied to conductive regions 50 of the sensor top and bottom plates respectively, because switches S1 and S3 are closed.

STATE 1: SENSING PHASE: CHARGE SUMMATION

Next, Switch S9 opens and very shortly thereafter, switch S6 closes thereby connecting the sensor center pin 96 to the inverting input of operational amplifier (op amp) OA1. Because switches S7 and S8 are closed during this time, the inverting input of OA1 is forced to the offset voltage of the operational amplifier which is typically less than 100 micro volts (μV) in absolute value.

STATE 2: SENSING PHASE: CHARGE TRANSFER

Next switches S7 and S8 open, leaving only capacitor $C_1$ in the feedback path of op amp OA1 in preparation for the charge transfer from the sensor 10'. In addition, the charge injected from switch S7 onto capacitor $C_1$ is balanced by the charge injected via switch S8 onto $C_2$ thereby providing first order cancellation of the parasitic effect at the output of op amp OA1.

STATE 3: SENSING PHASE: SENSE POSITION OF MASS 16' BETWEEN TOP AND BOTTOM PLATES 50

Next, charge is transferred from the sensor 10' to the op amp OA1 by opening switches S1 and S3 and very shortly after closing switches S2 and S3 and very shortly after closing S2 and S4. As a result, a voltage change of $V_R$ occurs on the sensor top plate 50 and $-V_R$ on the bottom plate 50 both with respect to the sensor center lead 96 which remains at the offset of the sense op amp OA1 plus the charge injection pedestal of S8-$C_2$ after a short transient.

Therefore charge $\Delta Q = Q_1 + Q_2$ is transferred to the sensor center lead 96 where $Q_1 = V_r C_T$ and $Q_2 = -V_R C_B$, where $C_T$ represents the capacitance between the top plate 50 and the top of mass 16' plate 52, and $C_B$ represents the capacitance between the bottom plate 50 and the bottom of mass 16' plate 52. As a result, charge of amount $\Delta Q = V_R(C_T - C_B)$ is transferred onto the feedback capacitor $C_1$.

At the end of state 3, the op amp OA1 output on lead 97 settles to the voltage value, $$\frac{-\Delta Q}{C_1} = \frac{-V_R(C_T - C_B)}{C_1}.$$

Because

-continued $$C_T = \frac{\epsilon_O A}{d-x},$$

and $$C_B = \frac{\epsilon_O A}{d+x},$$

$$(C_T - C_B) = \left( \frac{\epsilon_O A}{d} \cdot \frac{2x/d}{1-(x/d)^2} \right).$$

As a result, the sense voltage on lead 97 can be approximated as a linear function of displacement x from a center position for |x|<<d, which applies under normal operating conditions.

STATE 4: SAMPLE MODE

During state 4, the sample/hold circuit arrangement 99 including op amp OA2 and switches S10, S11, S12, S13 acquires the voltage $$\frac{+V_R(C_T - C_B)}{C_1}$$

at its output 98 by going into the sample mode with S10 and S12 open and S11 and S13 closed. After settling for one state time, such switches change back into the hold mode by opening switches S10 and S12 and closing switches S11 and S13. Very shortly thereafter the hold mode is entered during which forcing of mass 16' to its center position is performed.

STATES 5–31: FORCING PHASE

In the forcing phase, voltage $V_F$ is applied to the sensor conductive areas 52 via lead 96. Simultaneously, the voltage $+V_R$ is applied to the top plate 50 and voltage $-V_R$ is applied to the bottom plate 50. The sense op amp OA1 is disconnected from the sensor 10' while the sample/hold circuit 99 holds at its output lead 98 the last sampled value of voltage representative of the sensor position. The cycle is repeated at the overall system clock rate.

Electric Force on Mass 16 During Forcing Mode

During the forcing mode the sensor 10' has a voltage $(V_R - V_F)$ across the top area 50 of top cover 12 to the top conducting area 52 of mass 16' thereby generating an up force $$f_{up} = \frac{\epsilon_O A}{2} \cdot \frac{(V_R - V_F)^2}{(d-x)^2},$$

and it has a voltage $(V_F - (-V_R)) = V_R + V_F)$ across the bottom conducting area 50 of mass 16' to bottom conducting area 50 of bottom cover 14 thereby generating a down force, $$f_{dn} = \frac{\epsilon_O A}{2} \cdot \frac{(V_R - V_F)^2}{(d+x)^2}.$$

The total electric field force on the mass 16' during the forcing mode of operation is $$f_{FM_e} = \frac{\epsilon_O A}{2} \left[ \frac{(V_R - V_f)^2}{(d-x)^2} - \frac{(V_R + V_f)^2}{(d+x)^2} \right]. \quad (1)$$

It is applied for a time $T_F = D_F T_{CLK}$, where $D_F$ is a constant representative of the duty factor during the forcing mode:

$$D_F = \frac{T_F}{T_{CLK}}.$$

The total force on mass 16' during the entire operational cycle is $$f_e = D_F \cdot f_{M_e}. \quad (2)$$

The effect of the feedback compensator circuit 102 is to cause the electromagnetic field force $f_e$ during the forcing mode to be equal to the input force applied to the sensor 10', where $$f_{in} = M \cdot a_{in},$$

where M is the mass of mass 16' of sensor 10' and $a_{in}$ is the acceleration applied to the sensor 10'.

The feedback compensator forces the absolute value of x, that is |x|, to be very small, typically less than d/1000.

As a result, the force $f_e$ is obtained by setting x=0 in equations (1) and (2), $$f_e = D_F \cdot \left( \frac{-2\epsilon_O A}{d^2} \right) V_R V_F. \quad (3)$$

When operated in a gravity field, the input force $f_{in}$ which must be opposed by the electromagnetic force $f_e$ of equation (3) is $-mg$, $$or\ f_e = mg,$$

or $$V_F = \frac{M \cdot g \cdot d^2}{D_F V_R \cdot 2\epsilon_O A}. \quad (4)$$

Such equilibrium condition may be represented by the symbol $V_{fo}$.

Figure 4:
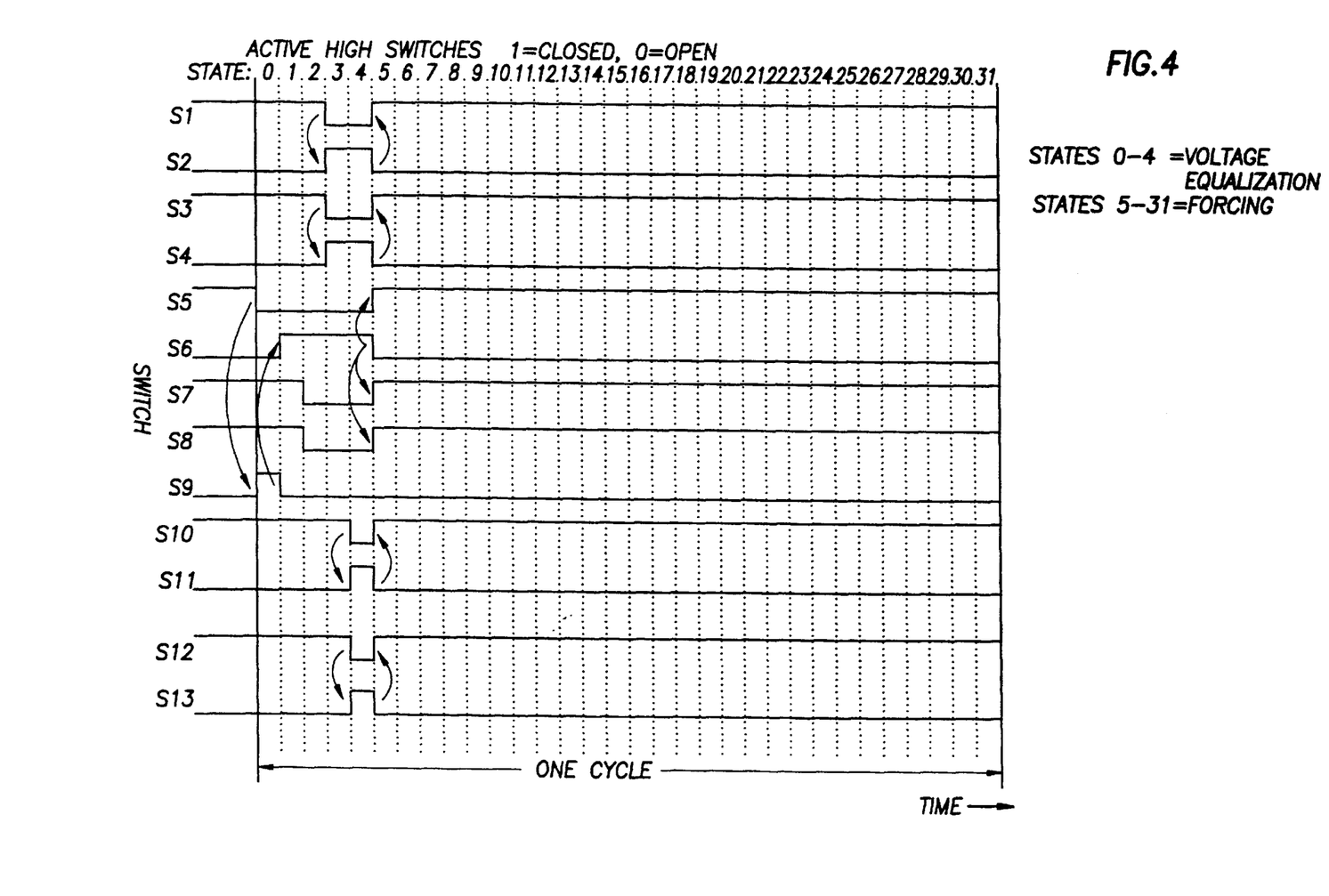
FIG. 4 illustrates a timing diagram which shows how the circuit of FIG. 3 is configured during three time phases of an operating cycle.

The electromechanical response of the accelerometer of FIG. 3 may be found by considering all of the mechanical forces and all of gravity and electric field forces on the sensor 10' during one cycle of FIG. 4. Averages of the forces during the cycle may be used under the assumption that the overall clock frequency is much greater than the characteristic frequency of the accelerometer.

During states 0, 1, and 2, the sensor 10' has a voltage of $(V_R - 0) = V_R$ applied across the top conductive area 50 to the top conductive area 52 of mass 16' and $(0 - (-V_R)) = V_R$ across the bottom conductive area 52 to the bottom conductive area 50 of bottom cover 14. Because x≈0, these two forces tend to balance each other, but the effect of such sensing voltages cannot be ignored when considering the sensor dynamic response. Accordingly, during certain states of the sensing phase, (e.g., states 0, 1, 2) voltage $V_R$ exists from top area 50 to top mass area 52 and $V_R$ exists from the bottom conducting area 52 to the bottom area 50 of bottom plate 14, for 3/32 of the cycle time=$D_S$.

During the forcing mode, e.g., during states 5–31, voltage $(V_R - V_f)$ exists from top area 50 to top mass area 52 and voltage $(V_R + V_F)$ exists from the bottom conducting area 52 to the bottom area 50 of bottom plate 14, for 27/32 of the cycle time=$D_f$.

The net force applied to mass 16' caused by electric fields across mass 16' from top and bottom plates 12, 14 may be represented as the weighted average of these two conditions:

$$K_e = D_s \frac{\delta f_e}{\delta x}\bigg|_{sensing\ phase} + D_f \frac{\delta f_e}{\delta x}\bigg|_{forcing\ phase} \quad (5)$$

During the sensing phase, $$f_e = \frac{\epsilon_O A}{2}\left(\frac{V_R^2}{(d-x)^2} - \frac{V_R^2}{(d+x)^2}\right), \quad (6)$$

or differentation, $\frac{\delta f_e}{\delta x}$, $$f_e = \frac{\epsilon_O A}{2}\left(\frac{-2V_R^2(-1)}{(d-x)^3} - \frac{-2V_R^2}{(d+x)^3}\right)$$

Equation (6) evaluated at x=0 yields, $$\frac{\delta f_e}{\delta x}\bigg|_{sensing\ phase} = \frac{2\epsilon_O A V_R^2}{d^3}. \quad (7)$$

During the forcing phase, $$f_e = \frac{\epsilon_O A}{2}\left(\frac{(V_R - V_{fo})^2}{(d-x)^2} - \frac{(V_R + V_{fo})^2}{(d+x)^2}\right), \quad (8)$$

$$\frac{\delta f_e}{\delta x} = \frac{\epsilon_O A}{2}\left(\frac{-2(V_R - V_{fo})^2(-1)}{(d-x)^3} - \frac{-2(V_R + V_{fo})^2}{(d+x)^3}\right) \quad (9)$$

Evaluated at x=0, equation 9 becomes $$\frac{\delta f_e}{\delta x}\bigg|_{forcing\ phase} = \frac{2\epsilon_O A}{d^3}(V_R^2 + V_{f0}^2). \quad (10)$$

Accordingly, the total electric spring constant, averaged over all cycles is, $$K_e = D_s \cdot \frac{2\epsilon_O A}{d^3}V_R^2 + D_f \cdot \frac{2\epsilon_O A}{d^3}(V_R^2 + V_{f0}^2). \quad (11)$$

The system of sensor 10' of FIG. 3 may be characterized by a characteristic equation in the LaPlace domain as $$H(s) = \frac{1}{s^2 + \frac{B}{M}s + \frac{K_m - K_e}{M}} \quad (12)$$

where H(s) represents the ratio of displacement of the mass 16' to the acceleration applied to sensor 10', and B is the coefficient of damping of the mass M as it moves between plates 12, 14 and $K_m$ is the equivalent mechanical spring constant of springs 72, 74.

Manufacture of Accelerometer of FIG. 3 for Open Loop: e.g., $V_F=0$.

A certain characteristic of the sensor 10' may be selected and $K_e$ adjusted to produce such characteristic. For example, suppose it is desired that the sensor 10' of FIG. 3 be critically damped. The mechanical spring factor $K_m$ and the damping factor B may be specified for a mechanical sensor already in being. Critical damping requires that $$\left(\frac{B}{M}\right)^2 = \frac{4(K_m - K_e)}{M}, \quad (13)$$

then, $$K_e = K_m - \frac{B^2}{4}$$

then,

The open loop accelerometer may be manufactured so as to achieve critical damping by providing $V_R$ from equation (11) and equation (13) where the parameters of B, $K_m$, $\epsilon_O$, A, d and duty cycle $D_S$ are provided with an existing mechanical structure.

Vice versa, if the arrangement of sensor 10' can be manufactured after the voltage $V_R$ and critical damping are specified, the parameters of $\epsilon_O$, A, d, B, and $K_m$ are adjusted so as to achieve the relationship of equation (13).

Manufacture of Accelerometer of FIG. 3 with Closed Loop: e.g., $V_F \neq 0$.

For a $\Delta\Sigma$ analog to digital converter based accelerometer, as described in U.S. Pat. No. 4,922,756 described above and incorporated herein, a feedback voltage $V_F$ is applied in pulsed form, either positive or negative, but at a constant voltage level. The loop dynamics are optimized when $K_m = K_e$ such that the mechanical response from equation 12 of sensor 10' becomes, $$H(s) = \frac{1}{s\left(s + \frac{B}{M}\right)} \quad (14)$$

In other words, the mechanical response is characterized as a pure integrator and a damped integrator with very high sensor gain (or sensitivity) at low frequencies. Such characteristic improves the signal to noise ratio of the accelerometer.

In order to manufacture such a sensor, the value of $K_e$ is specified from equation 11, and then the mechanical sensor 10' is manufactured with springs having a mechanical spring constant $K_m$ equal to $K_e$.

Manufacture of Accelerometer of FIG. 3 with Robust Springs but with Accelerometer with High Sensitivity at Low Frequency.

The characteristic equation of the sensor 10' may be written as $$s^2 + \frac{B}{M}s + \frac{K_m - K_e}{M} = O, \quad (15)$$

where $K_e$ represents the averaged electric spring constant of the sensing and forcing modes, or, $$s^2 + \frac{\omega_o}{Q}s + \omega_o^2 = O \quad (16)$$

where, $$\omega_o^2 = \frac{K_m - K_e}{M} = \frac{K_{eff}}{M} \quad (17)$$

and, $$\frac{\omega_o}{Q} = \frac{B}{M},$$

or $$Q = \frac{1}{B}(K_{eff} \cdot M)^2 \quad (18)$$

or $$Q_e = Q \cdot \gamma \quad (19)$$

where, $$\gamma = \sqrt{1 - \frac{K_e}{K_m}}.$$

With $K_e=0$, the sensor 10 or 10' is characterized by two poles, $$s = -\frac{\omega_o}{2Q} \pm j\sqrt{\frac{K_m - 0}{M}}. \tag{20}$$

As the magnitude of electromagnetic feedback force increases, as represented by $K_e$, the poles follow a line of constant real part until the term, $$\sqrt{\frac{K_m - K_e}{M}},$$

eventually becomes zero when $K_m=K_e$, and two poles exist at $$\frac{-\omega_o}{Q} = -\frac{B}{M}$$

on the real axis. At this point the sensor is critically damped.

If $K_e$ becomes too large, as compared to $K_m$, then one pole enters the right half phase, and the sensor becomes unstable.

The sensitivity of the steady state transfer function at frequency $\omega_O=0$ of the sensor is characterized by, $$|H(o)| = \frac{1}{\omega_o^2} \tag{21}$$

With electromagnetic feedback forcing, the sensitivity to steady state forces is, $$|H(o)| = \frac{1}{\omega_{oe}^2}, \tag{22}$$

or $$|H(o)| = \frac{1}{\omega_o^2 \gamma} \tag{23}$$

where, $$\gamma = \sqrt{1 - \frac{K_e}{K_m}}.$$

Equation (23) indicates that the system sensitivity at D.C. ($\omega_O=0$) increases as $K_e$ approaches $K_m$.

As discussed above, especially by reference to FIG. 2, it is highly desirable to have a connecting arrangement of springs which can withstand high g forces applied to support 18'. A stiff spring arrangement characterized by a high mechanical spring constant $K_m$ is incompatible with producing an accelerometer system of FIG. 3 characterized by high sensitivity $|H(\omega)|$ at low frequency steady state acceleration forces, because, as equation (23) indicates, if $\gamma=0$, $$|H(o)| = \frac{1}{\omega_o^2} = \frac{M}{K_m}.$$

If $K_m$ is high, as desired for a robust spring characteristic, then $|H(o)|$ is relatively low (if there is no electromagnetic feedback force). Therefore, according to one aspect of the invention, the sensor structure 10 or 10' of FIG. 1 or FIG. 2 is first provided with a mechanical structure characterized by a desired mechanical spring constant $K_m$. The spring constant of the sensor structure 10 or 10' of FIG. 1 or 2 may be adjusted during fabrication of the sensor by increasing the thickness of the springs. A maximum thickness of such springs is controlled by the thickness of an EPI layer provided during micromachining as described in the before mentioned copending U.S. patent application Ser. No. 08/218,363 (now U.S. Pat. No. 5,484,073). Next the level of electromagnetic feedback force is determined by the relationship, $$|H(o)| = \frac{1}{\omega_o^2 \gamma}$$

where $$\gamma = \sqrt{1 - \frac{K_e}{K_m}}$$

by specifying a required value of $|H(o)|$ and determining $K_e$.

For voltage feedback to conductive areas 50 of top and bottom plates 12, 14 of FIG. 3, equation (11) is used to specify $V_R$ and $V_{fo}$.

Manufacture of the system to minimize noise.

During the charge summation phase state 0, the capacitor $C_1$ (see FIG. 3) samples the offset voltage, and simultaneously the 1/f noise of the sense amplifier 120.

The white noise on $C_1$ is sampled and connected directly to the output amplifier 120 such that the 1/f noise is subtracted off. Thus, the output noise density square is $$N_E = \frac{K_T}{C_1}.$$

During the charge summation phase, the noise on the sensor capacitors (the spaces between the mass 16' and conductive areas 50 of top and bottom plates 12, 14) is sampled and transferred to the feedback capacitor $C_F$. The output noise squared of such process is $$N_S = \frac{K_T}{C_{SEN}} \left(\frac{C_{SEN}}{C_1}\right)^2.$$

The output noise voltage squared from these two sources is, $$e_{no}^2 = \frac{KT}{C_1}\left(1 + \frac{C_{SEN}}{C_1}\right).$$

The sensor transfer function is $$H_m(s) = \frac{1}{s^2 + \frac{B}{M}s + \frac{K_m - K_e}{M}}$$

$$|H_m(f)| = \frac{1}{\sqrt{\left(\frac{(K_m - K_e)}{M} - (2\pi f)^2\right)^2 + \left(\frac{B}{M}2\pi f\right)^2}}.$$

The sense amplifier output noise spectral density is $$e_{no} = \sqrt{\frac{K_T}{C_1}\left(1 + \frac{C_{SEN}}{C_1}\right)\left(\frac{2}{f_s}\right)} \left(\frac{\text{volts}}{\sqrt{f}}\right)$$

and such noise is white.

The equivalent acceleration that will equal that noise is, $$a_{nig} = \frac{e_{no}}{(T_S)(H_m(f))(9.8)}$$

$$a_{nig} = \frac{\sqrt{\frac{KT}{C_1}\left(1 + \frac{C_{SEN}}{C_1}\right)\left(\frac{2}{f_s}\right)}}{\left(4\frac{V_{REF}}{d}\right)\frac{C_o}{C_1}(H_m(f))(9.8)}$$

The RMS acceleration is obtained by integrating the noise density over the baseband:

$$a_{nT} = \sqrt{\int_1^{250} a_{nig}2 df}$$

where the baseband frequency is 250 $H_z$, for example. The value of $K_m$ which minimizes $a_{nT}$ may be found and used to manufacture the springs of the arrangements of FIG. 1 or 2 and FIG. 3.

Various modifications and alterations in the described methods of manufacture and apparatus will be apparent to those skilled in the art of the foregoing description which does not depart from the spirit of the invention. For this reason, such changes are desired to be included within the scope of the appended claims. The appended claims recite the only limitations to the present invention. The descriptive manner which is employed for setting forth the embodiments should be interpreted as illustrative but not limitative.

What is claimed is:

1. Apparatus for measuring a characteristic of motion comprising
   a sensor structure including a mass carried from a support structure by a connecting arrangement, said mass arranged to move with respect to said support structure with mass movement being opposed by a mechanical spring force of said connecting arrangement, said mechanical spring force being characterized by a mechanical spring constant,
   means for generating a displacement signal as a function of time which is representative of distance said mass has moved with respect to said support structure in response to force applied to said support structure,
   means responsive to said displacement signal for applying an electromagnetic feedback force as a function of time on said mass in a direction to move said mass to a predetermined position with respect to said support structure, said electromagnetic feedback force being characterized for small amplitudes of said displacement signal by an electric spring constant which is in a direction opposite that of said mechanical spring force,
   said sensor structure characterized by a high value of mechanical spring constant of said connecting arrangement and by an effective spring constant characterized by a small positive difference between said mechanical spring constant and said electric spring constant,
   whereby said sensor structure is characterized by high sensitivity to low frequency forces as compared to sensor structures having no electromagnetic feedback force but with a high mechanical spring constant, and by a connecting arrangement less susceptible to breaking as compared to a connecting arrangement characterized by a low mechanical spring constant.

2. Apparatus for measuring a characteristic of motion comprising a sensor structure including a mass carried from a support structure by a connecting arrangement, said mass arranged to move with respect to said support structure with mass movement being opposed by a mechanical spring force of said connecting arrangement, said mechanical spring force being characterized by a mechanical spring constant,
   means for generating a displacement signal as a function of time which is representative of distance said mass has moved with respect to said support structure in response to force applied to said support structure,
   means responsive to said displacement signal for applying an electromagnetic feedback force as a function of time on said mass in a direction to move said mass to a predetermined position with respect to said support structure, said electromagnetic feedback force being characterized for small amplitudes of said displacement signal by an electric spring constant which is in a direction opposite that of said mechanical spring force,
   said sensor structure characterized by a high value of mechanical spring constant of said connecting arrangement and by an effective spring constant characterized by a small positive difference between said mechanical spring constant and said electric spring constant,
   whereby said sensor structure is characterized by high sensitivity to low frequency forces as compared to sensor structures having no electromagnetic feedback force but with a high mechanicals spring constant, and by a connecting arrangement less susceptible to breaking as compared to a connecting arrangement characterized by a low mechanical spring constant, and
   wherein
   said mass of said sensor structure includes top and bottom conductive surfaces, and
   said apparatus includes top and bottom cover plates carried by said support structure and having conductive surfaces which face respective said top and bottom conductive surfaces of said mass, and
   said means responsive to said displacement signal for applying an electromagnetic feedback force on said mass includes means for applying a voltage difference between said conductive surfaces of said top and bottom cover plates and applying a reference voltage to said top and bottom conductive surfaces of said mass.

3. Apparatus for measuring a characteristic of motion comprising a sensor structure including a mass carried from a support structure by a connecting arrangement, said mass arranged to move with respect to said support structure with mass movement being opposed by a mechanical spring force of said connecting arrangement, said mechanical spring force being characterized by a mechanical spring constant,
   means for generating a displacement signal as a function of time which is representative of distance said mass has moved with respect to said support structure in response to force applied to said support structure,
   means responsive to said displacement signal for applying an electromagnetic feedback force as a function of time on said mass in a direction to move said mass to a predetermined position with respect to said support structure, said electromagnetic feedback force being characterized for small amplitudes of said displacement signal by an electric spring constant which is in a direction opposite that of said mechanical spring force, said sensor structure characterized by a high value of mechanical spring constant of said connecting arrangement and by an effective spring constant characterized by a small positive difference between said mechanical spring constant and said electric spring constant, whereby said sensor structure is characterized by high sensitivity to low frequency forces as compared to sensor structures having no electromagnetic feedback force but with a high mechanical spring constant, and by a connecting arrangement less susceptible to breaking as compared to a connecting arrangement characterized by a low mechanical spring constant, and wherein said mass of said sensor structure includes top and bottom conductive surfaces, and said apparatus includes top and bottom cover plates carried by said support structure and having conductive surfaces which face respective said top and bottom conductive surfaces of said mass, and said means responsive to said displacement signal for applying an electromagnetic feedback force on said mass includes means for applying a voltage difference between said conductive surfaces of said top and bottom cover plates and applying a reference voltage to said top and bottom conductive surfaces of said mass and wherein said mass is forced downwardly by a gravity force of magnitude M·g where M represents the value of said mass and g represents the value of acceleration of said mass of said gravity force, and wherein said mass is balanced to be at a position $d_o$ between said top and bottom cover plates by a force $f_e(o)$ according to the relationship $$f_e(o) = \frac{\epsilon A}{2} \frac{V_o^2}{d_o^2},$$

and said electric spring constant is represented by the relationship $$K_e = \epsilon A 2 \frac{V_o^2}{d_o^2},$$

where, $\epsilon$ represents the numerical value of the permittvity of material in space between the conductive surfaces of said mass and said top and bottom cover plates, A represents the area of said conductive surface, $d_o$ represents the neutral position of said mass between top and bottom cover plates, and $V_o$ represents the voltage required to produce an upward force $f_e(o)$ which balances said downward force of gravity M·g, that is, $$V_o = d_o \sqrt{\frac{2Mg}{\epsilon A}}.$$

4. A method for manufacturing apparatus which measures a characteristic of motion comprising the steps of, providing a sensor structure including a mass carried from a support structure by a connecting arrangement, said mass arranged to move with respect to said support structure with mass movement being opposed by a mechanical spring force of said connecting arrangement, said mechanical spring force being characterized by a mechanical spring constant, providing means for generating a displacement signal as a function of time which is representative of distance said mass has moved with respect to said support structure in response to force applied to said support structure, providing means responsive to said displacement signal for applying an electromagnetic feedback force as a function of time on said mass in a direction to move said mass to a predetermined position with respect to said support structure, said electromagnetic feedback force being characterized for small amplitudes of said displacement signal by an electric spring constant which is in a direction opposite that of said mechanical spring force, fabricating said sensor structure with a mechanical spring constant $K_m$ representative of a desired mechanical characteristic of said connecting arrangement, and providing said electromagnetic feedback force represented by an electric spring constant $K_e$ so that the difference between said mechanical spring constant and said electric spring constant produces a desired characteristic of said apparatus.

5. A method for manufacturing apparatus which measures a characteristic of motion comprising the steps of, providing a sensor structure including a mass carried from a support structure by a connecting arrangement, said mass arranged to move with respect to said support structure with mass movement being opposed by a mechanical spring force of said connecting arrangement, said mechanical spring force being characterized by a mechanical spring constant, providing means for generating a displacement signal as a function of time which is representative of distance said mass has moved with respect to said support structure in response to force applied to said support structure, providing means responsive to said displacement signal for applying an electromagnetic feedback force as a function of time on said mass in a direction to move said mass to a predetermined position with respect to said support structure, said electromagnetic feedback force being characterized for small amplitudes of said displacement signal by an electric spring constant which is in a direction opposite that of said mechanical spring force fabricating said sensor structure with a mechanical spring constant $K_m$ representative of a desired mechanical characteristic of said connecting arrangement, and providing said electromagnetic feedback force represented by an electric spring constant $K_e$ so that the difference between said mechanical spring constant and said electric spring constant produces a desired characteristic of said apparatus, wherein said electromagnetic feedback force is adjusted such that the difference between said mechanical spring constant and said electric spring constant is substantially zero, such that the transfer function of said sensor structure includes a pure integrator.

6. A method for manufacturing apparatus which measures a characteristic of motion comprising the steps of, providing a sensor structure including a mass carried from a support structure by a connecting arrangement, said mass arranaed to move with respect to said support structure with mass movement being opposed by a mechanical spring force of said connecting arrangement, said mechanical spring force being characterized by a mechanical spring constant, providing means for generating a displacement signal as a function of time which is representative of distance said mass has moved with respect to said support structure in response to force applied to said support structure, providing means responsive to said displacement signal for applying an electromagnetic feedback force as a function of time on said mass in a direction to move said mass to a predetermined position with respect to said support structure, said electromagnetic feedback force being characterized for small amplitudes of said displacement signal by an electric spring constant which is in a direction opposite that of said mechanical spring force, fabricating said sensor structure with a mechanical spring constant $K_m$ representative of a desired mechanical characteristic of said connecting arrangement, and providing said electromagnetic feedback force represented by an electric spring constant $K_e$ so that the difference between said mechanical spring constant and said electric spring constant produces a desired characteristic of said apparatus, wherein said steps of providing means for generating a displacement signal and means for applying a feedback force on said mass includes the step of providing a controller means for applying a reference electric field across said mass during a sensing phase of an operating cycle and for applying a forcing electric field across said mass during a forcing phase of said operating cycle, and said step of providing said electromagnetic feedback force represented by an electric spring constant $K_e$ as the sum of an equivalent spring constant during said sensing phase weighted by a duty factor representative of the time that the sensing phase occurs in said cycle and an equivalent spring constant during said forcing phase weighted by a duty factor representative of the time that the forcing phase occurs in said cycle.

7. A method for manufacturing apparatus for measuring a characteristic of motion comprising the steps of providing a sensor structure including a mass carried from a support structure by a connecting arrangement, said mass arranged to move with respect to said support structure with mass movement being opposed by a mechanical spring force of said connecting arrangement, said mechanical spring force being characterized by a mechanical spring constant, providing means for generating a displacement signal as a function of time which is representative of distance said mass has moved with respect to said support structure in response to force applied to said support structure, providing means responsive to said displacement signal for applying an electromagnetic feedback force as a function of time on said mass in a direction to move said mass to a predetermined position with respect to said support structure, said electromagnetic feedback force being characterized for small amplitudes of said displacement signal by an electric spring constant which is in a direction opposite that of said mechanical spring force, providing said electromagnetic feedback force represented by an electric spring constant $K_e$, determining an effective spring constant $$K_{eff} = K_m - K_e$$

where $K_m$ represents the mechanical spring constant of said connecting arrangement such that a desired characteristic of said sense structure as a function of $K_{eff}$ results, and providing said connecting arrangement with a mechanical spring constant of $K_m = K_f + K_e$.

8. The method of claim 7 where said desired characteristic of said sense structure is its natural frequency, $$\omega_o = \sqrt{\frac{K_{eff}}{m}}$$

* * * * *